June 8, 1937.  J. L. CHESHIRE  2,083,492
CAMERA AND FILM PACK
Filed Jan. 24, 1936
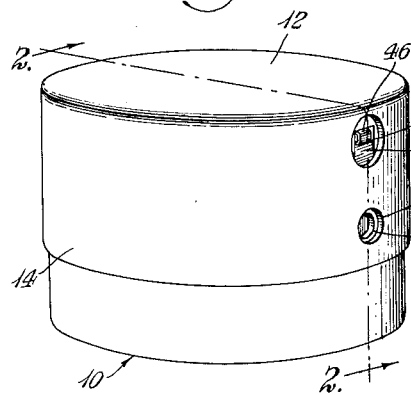
Fig. 1.
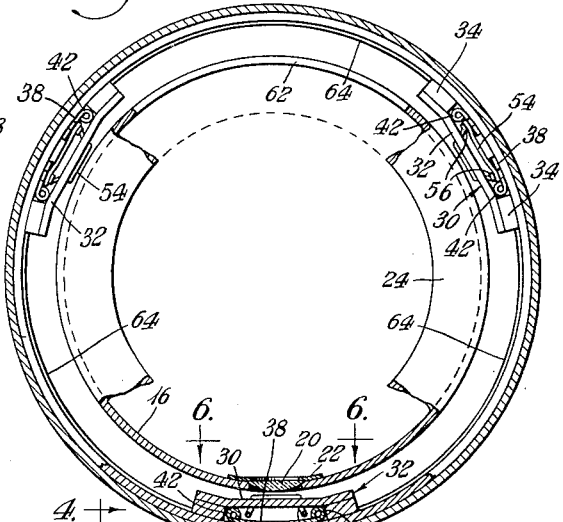
Fig. 3.
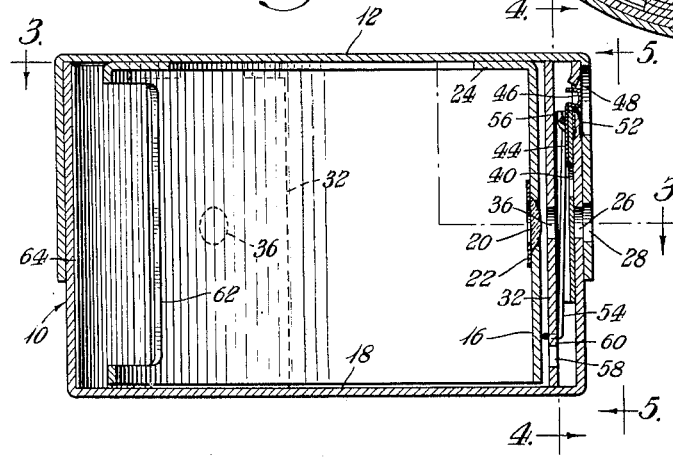
Fig. 2.
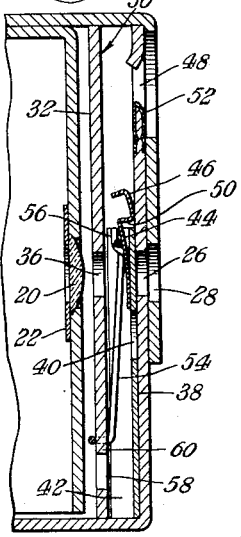
Fig. 7.
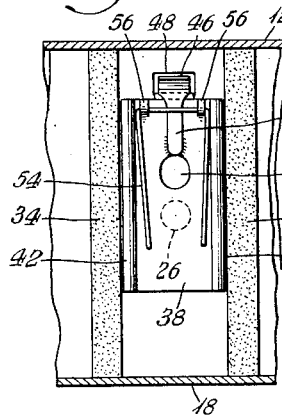
Fig. 4.
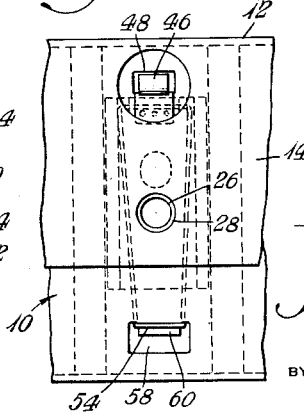
Fig. 5.
Fig. 6.
John L. Cheshire,
INVENTOR
BY Victor J. Evans & Co.
HIS ATTORNEYS Patented June 8, 1937

2,083,492

UNITED STATES PATENT OFFICE 2,083,492

CAMERA AND FILM PACK

John L. Cheshire, Jhansi City, India

Application January 24, 1936, Serial No. 60,735

13 Claims. (Cl. 95—19)

My invention relates to photography, and has among its objects and advantages the provision of an improved camera and film pack.

In the accompanying drawing:

Fig. 1 is a perspective view of a camera embodying the invention;

Fig. 2 is a sectional view along the line 2—2 of Fig. 1;

Fig. 3 is a sectional view along the line 3—3 of Fig. 2;

Fig. 4 is a sectional view along the line 4—4 of Fig. 2;

Fig. 5 is a view taken from the position indicated by the line 5—5 of Fig. 2;

Fig. 6 is a fragmentary view taken from the position indicated by line 6—6 of Fig. 3; and Fig. 7 is an enlarged sectional view along the line 7—7 of Fig. 4.

In the embodiment selected to illustrate my invention, I make use of a circular box 10 upon which a cover 12 is rotatably mounted. The cover includes a flange 14 extending inwardly of the box 10, but the fit is such as to permit the cover to be easily rotated. The box and the cover comprise paper in the nature of cardboard. To the inner side of the cover 12, I connect a cylindrical member 16 terminating in close relation with the bottom 18 of the box 10. The member 16 carries a lens 20 arranged within an opening in the member and secured in position by a washer-like element 22 glued in place. In Fig. 2, the member 16 includes a flange 24 glued to the cover 12. The member 16 is arranged in concentric relation with the box 10.

Three openings 26 are provided in the box 10, while the flange 14 of the cover is provided with one opening 28 arranged to be selectively aligned with the openings 26 through rotation of the cover relatively to the box. Within the box 10 I mount three walls 30. These walls are identical in construction and function. In Fig. 3, each wall includes a straight surface 32 supported in spaced relation with the box 10 through the medium of spacers 34 glued to the wall and the box. Each wall is provided with an opening 36 aligned with the openings 26 and 28 and the lens 20. A shutter 38 is associated with each wall 30.

Each shutter 38 comprises a metallic plate having an opening 40 arranged to move across the aligned openings 26 and 28 when the shutter moves from the position of Fig. 2 to the position of Fig. 7. In Fig. 3, I illustrate the shutters as being bent along their edges to provide beads 42 housed between the walls 30 and the box 10.

The shutters are mounted for free movement with respect to their longitudinal axis, but are restrained from lateral shifting because of the spacers 34, so that the openings 40 will always move across the aligned openings 26 and 28. Each shutter is provided with a flexible metallic element 44 having one end welded to its respective shutter and provided with a hook-like part 46 arranged to lie within an opening 48 in the box 10.

In Fig. 7, the ledge 50 of the hook-like member 46 is arranged to engage the metallic lined edge 52 of its respective opening 48 for supporting the shutter in an operative position against the tension of a rubber band 54. Each shutter is provided with two integral hooks 56 for connection with the rubber band, while the associated wall 30 is provided with an opening 58 (see Fig. 5), which opening is shaped to provide a projection 60 for connection with the rubber band. The tension of the rubber band tends to pull its associated shutter inwardly of the box 10. The shutter may be released by pressing inwardly on the member 46 for moving the ledge 50 out of engagement with its associated edge 52. When the element 44 has been flexed sufficiently far, the shutter is free and the rubber band pulls the shutter down. As the opening in the shutter passes across the aligned openings 26 and 28, light is allowed to pass through the lens 20 so as to form an image on the film arranged in operative relation with the lens.

Referring to Fig. 3, the shutters are arranged at an angle of 120° about the wall of the box 10 so that the light passing through the shutter will be projected against the opposite side of the wall between the two other shutter assemblies. In Figs. 2 and 3, I illustrate the cylindrical member 16 as being provided with a large opening 62 for the passage of light, which opening is properly aligned with the film when the cover 12 is rotated for bringing the opening 28 into alignment with one of the openings 26.

I have indicated the films at 64, which films lie against the wall of the box 10. Two edges of each film are positioned between two of the spacers 34, and are firmly retained in position because of the bend in the film and the angularity of the two co-operating spacers. The films may easily be placed in position by removing the cover 12 and sliding the film inwardly along the wall of the box 10 or otherwise bending the film by positioning its edges against the spacers 34 and pushing the film against the wall of the box 10.

All the parts of my camera are formed of stiff paper with the exception of the shutter 38, the flexible member 44, the metallic liner 52, and the lens 20. The camera may be manufactured within a price range which permits the camera to be employed as a film package. Thus, in purchasing films the camera and the films would be sold as a unit.

Without further elaboration, the foregoing will so fully explain my invention that others may, by applying current knowledge, readily apply the same under various conditions of service.

I claim:

1. A camera comprising a box including a bottom and a wall, a shutter associated with said wall, a cover movably connected with the box for closing the open end thereof, a lens, means carried by said cover for supporting the lens in operative relation with said shutter, means carried by the cover for covering and uncovering the shutter, and means carried by said wall for supporting film.

2. A camera comprising a box having a cylindrical wall provided with a shutter, a cover rotatably mounted upon said cylindrical wall, a lens, means carried by the cover for supporting the lens in operative relation with said shutter, means associated with the box for supporting film, and means carried by the cover for covering and uncovering the shutter.

3. A camera comprising a box having a cylindrical wall provided with a shutter, a cover rotatably mounted upon said cylindrical wall, a lens, means carried by the cover for supporting the lens in operative relation with said shutter, said cylindrical wall having an opening arranged in operative relation with said shutter, means associated with the box for supporting film, and means carried by the cover for covering and uncovering the opening in said cylindrical wall.

4. A camera comprising a box including a bottom and a wall, said wall being provided with a plurality of shutters, a cover for closing the open end of the box and being shiftable with respect to the latter, a lens, and a lens support carried by said cover and arranged to move the lens into operative relation with any one of said shutters by shifting the cover upon the box.

5. A camera comprising a box including a bottom and a wall, said wall being provided with a plurality of shutters, a cover for closing the open end of the box and being shiftable with respect to the latter, a lens, a support for the lens carried by said cover and arranged to move the lens into operative relation with any one of said shutters by shifting the cover upon the box, and means carried by the cover for covering and uncovering said shutters.

6. A camera comprising a box including a bottom and a circular wall, a plurality of shutters associated with said wall, a cover for closing the open end of the box and having a cylindrical flange embracing said wall, said cover being rotatable on the box, means associated with the wall for supporting film, a lens, and a support for the lens carried by said cover, said lens being arranged to be positioned in operative relation with any one of the shutters by rotating the cover upon the box.

7. A camera comprising a box including a bottom and a circular wall, a plurality of shutters associated with said wall, a cover for closing the box, said cover comprising a top and a flange arranged to embrace said wall, a cylindrical flange carried by said cover and disposed within said box in spaced relation with said wall, a lens carried by said flange, said lens being shiftable into operative relation with any one of the shutters by rotating the cover relatively to the box, means carried by said wall for supporting film, said flange being provided with an opening arranged in operative relation with said lens, to project an image upon a portion of said film.

8. In a camera, a box having a wall provided with an opening and a shutter arranged in operative relation therewith, said shutter comprising a closure plate arranged to normally close said opening, said shutter plate having an opening arranged to pass over said first-named opening when the shutter plate is shifted from one position to another, means for guiding the shutter plate, means for holding the shutter plate in a normal position, resilient means for shifting the shutter plate for moving its opening across said first-named opening, and a converging lens arranged in operative relation with said shutter.

9. In a camera, a box having a wall provided with an opening and a shutter arranged in operative relation therewith, said shutter comprising a closure plate arranged to normally close said opening, said shutter plate having an opening arranged to pass over said first-named opening when the shutter plate is shifted from one position to another, means for guiding the shutter plate, means for holding the shutter plate in a normal position, resilient means for shifting the shutter plate for moving its opening across said first-named opening, a converging lens arranged in operative relation with said shutter, and a cover for said box, said cover being shiftable with respect to the box and including means for covering and uncovering said first-named opening.

10. In a camera, a box including a wall provided with an opening, a shutter carried by said wall in operative relation with said opening, a shutter plate slidably mounted upon said wall and having an opening arranged to move across said first-named opening when the shutter plate is moved from one position to another, resilient means for imparting rapid movement to the shutter plate, and means for latching the shutter plate in a closed position against the tension of said resilient means.

11. In a camera, a box including a wall provided with an opening, a shutter carried by said wall in operative relation with said opening, a shutter plate slidably mounted upon said wall and having an opening arranged to move across said first-named opening when the shutter plate is moved from one position to another, resilient means for imparting rapid movement to the shutter plate, means for latching the shutter plate in a closed position against the tension of said resilient means, and a cover for said box, said cover being shiftable upon the box and including means for covering and uncovering said first-named opening.

12. A camera comprising a box having a cylindrical wall provided with a shutter, a cover rotatably mounted upon said cylindrical wall and having a lens carried thereby and positioned in operative relation with said shutter, said cylindrical wall having an opening arranged in operative relation with said shutter, means associated with the box for supporting film, and means carried by the cover for covering and uncovering the opening in said cylindrical wall, said box and said cover comprising paper.

13. In a camera, a wall provided with an opening, a shutter plate for closing said opening and having an opening arranged to move over the first-named opening when the shutter plate is moved from one position to another, means fastened to the wall for guiding the shutter plate, a rubber band connected with the shutter plate and a fixed support for imparting rapid movement to the shutter plate, said wall being provided with a second opening, and a resilient latch member arranged to project through said second opening for holding the shutter in a closed position against the tension of said rubber band.

JOHN L. CHESHIRE.